Aug. 17, 1965

I. BALAN 3,201,597

DIMMER FOR ELECTRIC LIGHTS

Filed Nov. 1, 1960

INVENTOR.
ISADORE BALAN
BY
ATTORNEY

Aug. 17, 1965  I. BALAN  3,201,597
DIMMER FOR ELECTRIC LIGHTS
Filed Nov. 1, 1960  2 Sheets-Sheet 2

INVENTOR.
ISADORE BALAN
BY *Allen M. Krass*
ATTORNEY

United States Patent Office 3,201,597
Patented Aug. 17, 1965

3,201,597
DIMMER FOR ELECTRIC LIGHTS
Isadore Balan, 18249 Robson, Detroit 35, Mich.
Filed Nov. 1, 1960, Ser. No. 66,471
2 Claims. (Cl. 307—88.5)

This invention relates to electronic circuitry for controlling the current flow to a load and more particularly to a device employing a controlled rectifier to vary the portion of an alternating current cycle applied to a lamp and thereby control the intensity of the lamp.

Controlled rectifiers are solid state devices having three elements: an anode, a cathode and a gate. The devices provide a high cathode to anode impedance at all times and also provide a high anode to cathode impedance until the gate to cathode voltage exceeds a particular low value. At that point the anode to cathode impedance decreases greatly and remains at a low level until the anode to cathode voltage decreases to zero at which point the gate regains control of the device. In the manner of a thyratron a controlled rectifier may be used to control the portion of an alternating current cycle which flows from a source to a load. The alternating current voltage reversals allow the gate to regain control of the device at the end of each cycle.

It is the primary object of the present invention to provide a device employing a controlled rectifier which may be used to vary the portion of a cycle flowing to an incandescent or florescent lamp load and to thereby control the illumination intensity of such lamps.

In order that the dimmer may be utilized in residences, it is desirable that it be simple in construction, employe inexpensive components, be reliable and easy to install. Controlled rectifiers are inherently relatively expensive devices, and it is therefore desirable that the control employ only one such device. Since the controlled rectifier must pass both alternations of an alternating current cycle to the lamp load in order to obtain full brilliance and eliminate flicker, novel circuitry is necessitated.

It is additionally desirable that the circuitry of the dimmer be such that it may be placed in series with a lamp and an electrical power source so it may replace series switches in existing residential service.

One embodiment of the present invention solves these and other problems by circuitry which includes a controlled rectifier having its anode-cathode circuit shorting the midpoints of a full wave rectifier bridge which is connected in series with an alternating current power supply and a load. The controlled rectifier thereby experiences a full wave rectified voltage and when it is fired connects a lamp and load through one of two rectifier paths.

The trigger circuit for the gate of the controlled rectifier employs a voltage sensitive switching device shunted across a fixed capacitor. The capacitor is disposed across the midpoints of the bridge in series with a variable resistance so that as the line voltage rises, the capacitor charges at a rate which is dependent upon the setting of the variable resistance. When it reaches the breakdown voltage of the switching device, a voltage pulse is applied to the gate of the controlled rectifier shorting the midpoints of the bridge and allowing current to be passed to the load. This also provides a discharge path for the capacitor. The circuit therefore functions to shift the point in the A.C. cycle at which the controlled rectifier is fired as the variable resistance setting is changed so as to control the amount of power passed to the load.

The invention further provides a controlled direct current power source for charging the capacitor so that fluctuations in the line voltage do not affect the firing point of the controlled rectifier at high firing angles.

Another novel aspect of the present invention resides in the provision of a temperature sensitive element operative to terminate the functioning of the device when the controlled rectified junction temperature exceeds a predetermined value. The temperature sensitive device operates in conjunction with the triggering circuit for the controlled rectifier to provide a mode of operation in which the line voltage must be disconnected before the device may be made operative after a shut down because of excess temperature. In this respect the device resembles the operation of a circuit breaker which does not re-apply power to a controlled device as soon as it cools but rather must be reswitched into an operating position.

Other objects, applications and advantages of the present invention will be made apparent by the following detailed description of two embodiments of the invention. The description makes reference to the accompanying drawings in which.

Figure 1:
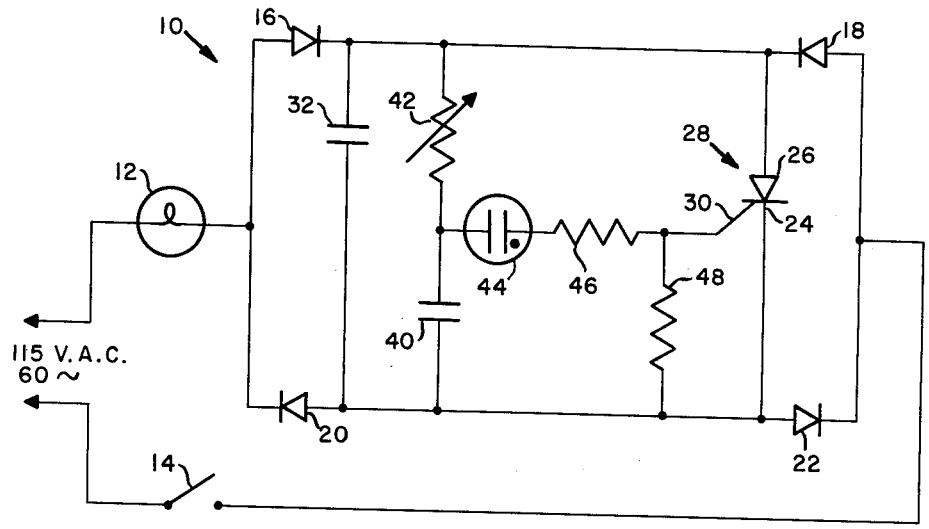
FIGURE 1 represents a circuit embodying certain principles of the present invention.

Referring to FIGURE 1, the dimming device generally indicated at 10 may be disposed in a series with the lamp load 12, an on-off switch 14 and a 115 volt, 60-cycle power supply. The on-off switch 14 may be ganged with the variable resistance utilized to control the amount of current passing to the lamp load 12 so that the initial turn of the shaft of the resistance closes the switch.

The devices utilizes four rectifiers 16, 18, 20 and 22 disposed in a bridge circuit. The rectifiers are preferably the solid state type using silicon or germanium. One end of the lamp 12 is connected between the rectifiers 16 and 20 and one terminal of the switch 14 is connected at the midpoint of the other two rectifiers 18 and 22. These terminals will be termed the inputs of the birdge. The other two terminals of the bridge, hereinafter referred to as its midpoints, are shunted by the cathode 24 and anode 26 of a silicon controlled rectifier generally indicated at 28.

When the controlled rectifier fires, a low resistance path is established to allow the current to pass from the cathode to the anode. It is seen that during one half cycle of alternating current this closes a path between the lamp and the power source through the rectifiers 16 and 22; while during the other half cycle it closes a path through the rectifiers 18 and 20. This technique is broadly disclosed in my prior patent application, Serial No. 46,514, dated August 1, 1960, now abandoned. The balance of the off switch 14 and retains that charge until the controlled rectifier through the application of a voltage to its gate at an appropriate place in each half alternating current cycle.

Figure 2A:
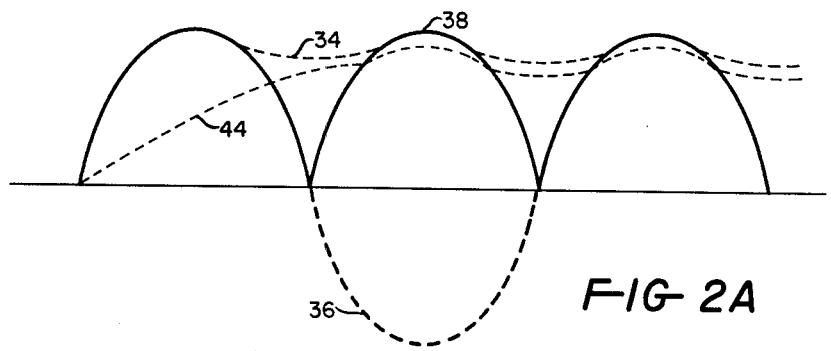
FIGURES 2A and 2B are graphic representations of certain wave forms which occur in the operation of the embodiment of FIGURE 1.

A capacitor 32 is shunted across the midpoints of the rectifier bridge and therefore also across the anode-cathode circuit of the controlled rectifier 28. The voltage across the capacitor therefore rises to a point approximating line voltage following the closure of the on-off switch 14 and retains that charge until the controlled rectifier fires so as to provide it with a direct discharge path. The line 34 in FIGURE 2A represents the voltage across the capacitor 32, when the controlled rectifier is not being fired, with respect to the line voltage 36 and the voltage across the midpoints of the bridge 38.

As the capacitor 32 is directly across the midpoints of the bridge, it charges with the line voltage until that voltage passes its peak and then largely retains its charge until the next peak is reached. Of course, when the controlled rectifier fires, the capacitor is provided with a direct discharge path.

The capacitor 32 is shunted by a second capacitor 40 which is disposed in series with a variable resistance 42. The setting of the resistance 42 controls the rate of charging the capacitor 40. Since the capacitor 32 retains its charge after the line voltage reaches a peak and begins to decay, the capacitor 40, which charges more slowly than the capacitor 32 because of the resistance 42, may rise to voltages which exceed the instantaneous line voltage. This is illustrated by curve 44 of FIGURE 2A which represents the voltage across the capacitor 40 when the controlled rectifier is not being fired.

The capacitor 40 is shunted by a series combination of a neon voltage regulating lamp 44 and the pair of resistors 46 and 48. The regulating lamp 40 is of the type which exhibits an extremely high resistance until the voltage across it reaches a particular value termed the strike voltage. It then fires and its resistance decreases to the point where voltage across it is equal to a particular value known as the sustaining voltage. It thereby acts as a switch or thyraton to impress the voltage of the capacitor 40 across the voltage divider network 46 and 48 and the gate 30 of the controlled rectifier which is connected to the midpoint of this voltage divider.

Figure 2B:
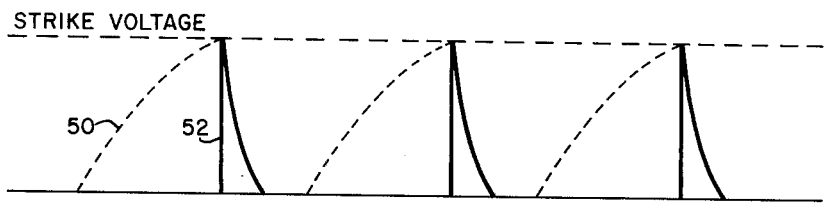

FIGURE 2B illustrates the relationship of the voltage across the capacitor 40, indicated by the line 50 and the gate to cathode voltage of the controlled rectifier, indicated by the curve 52. Upon the closure of the switch 14, the voltage across the capacitor 40 begins to rise in accordance with curve 45, FIGURE 2A. When it reaches a particular level equal to the strike voltage of the lamp 44, the lamp breaks down and imposes its voltage across the gate 30 of the controlled rectifier. This causes the controlled rectifier to fire and discharge the capacitor 40 through the resistance 42 so that the rate of voltage also decays almost instantaneously. At this point the controlled rectifier begins to conduct and remains in conductance until its anode-cathode voltage reaches zero. The voltage then begins to rise across both the capacitors 32 and 40 until the strike voltage is again reached across the lamp 44.

Varying the resistance 42 varies the rate at which the capacitor 40 charges the capacitor 32 and thereby varies the time with respect to the beginning of an alternating current cycle required to reach the strike voltage of the lamp 44. The circuit values are maintained in such a manner that in the extreme low position of the resistance 42, the capacitor 40 reaches the strike voltage at a point near the beginning of each alternating current cycle and the controlled rectifier is therefore conductive through most of the cycle and supplies almost full current to the lamp load 12. When the resistance 42 is at its high point, the capacitor 40 reaches the strike voltage at almost the end of each alternating current cycle so that the controlled rectifier is only conductive for a few degrees in each cycle and supplies only a small current to the lamp load 12.

If the voltage across the capacitor 40 were applied directly to the gate 30 of the controlled rectifier so that the controlled rectifier fired when the capacitor 40 reached its strike potential, a small variation in the line voltage would cause a substantial variation in the point in each alternating current cycle at which the lamp fired. Also variations in the required strike potential of the controlled rectifier as the rectifier changed temperature with use would also cause variations in the current passed to the lamp load. The use of the firing device 44 in the gate circuit allows the application of voltage to the gate in excess of the gate's striking potential at the exact point at which it is desired to fire the controlled rectifier. This results in highly dependable operation.

Figure 3:
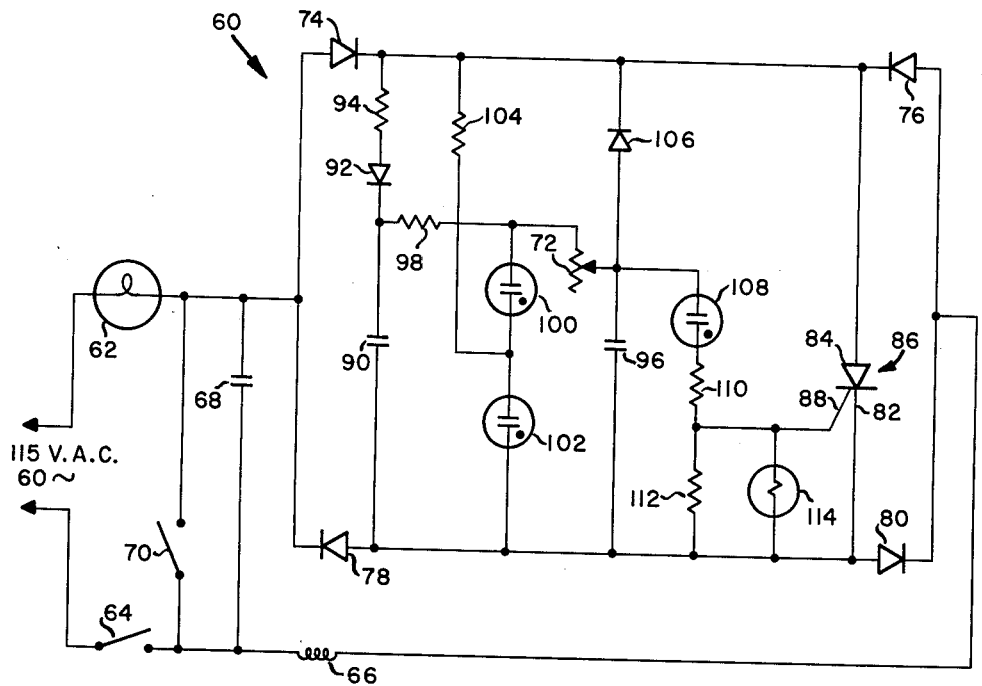
FIGURE 3 represents an electrical schematic diagram of the second embodiment of the present invention.

The circuit of FIGURE 3 illustrates a second embodiment of the invention. Again, the circuit, generally illustrated at 60, is disposed in series with a lamp load 62, an on-off switch 64, and a 115 volt, 60-cycle power line. An inductance coil 66 which is also disposed in the series combination acts in conjunction with a capacitor 68 which is shunted across the line, lamp and switch to filter out the higher frequency components of the wave form passed by the circuit 60 so as to eliminate radio interference. The external circuitry is completed by a second single pole, single throw switch 70 which also shunts the lamp, line and on-off switch 64.

Both the switches 64 and 70 may be ganged with a variable resistance 72 which is incorporated in the dimmer circuit 60 and which acts to vary the portion of the cycle passed to the lamp load 62 in the same manner as did the variable resistance 72 in the circuitry of FIGURE 1 in a manner which will be subsequently disclosed. With the switches 64 and 70 ganged to variable resistance 72, the arrangement is such that when the circuit is in an off state, an initial turn of the shaft of the potentiometer 72 closes the switch 64 and brings the circuit into operation. When the other end of rotation of the shaft is reached, the switch 70 is closed placing the lamp load 62 directly across the line and shunting out the circuit 60. With the resistances maintained at any intermediate state, a portion of each cycle is passed to the lamp and its illumination intensity is varied accordingly. The shorting out of the circuit 60 at the point of maximum conductance relieves the circuit of the high current carrying function at this common setting of the potentiometer.

The circuit 60 also uses four solid state rectifiers 74, 76, 78 and 80 in a bridge circuit. The external circuitry is connected to the common point of the rectifier 74 and 78 and the common point of the rectifier 76 and 80 which are termed the inputs of the bridge. The midpoints of the bridge are connected to the cathode 82 and anode 84 of a controlled rectifier generally indicated at 86. The balance of the circuitry controls the application of voltage to the gate 88 of the controlled rectifier to vary the portion of each alternating current half cycle in which the controlled rectifier 86 is conductive.

A capacitor 90 is disposed in series with a rectifier 92 and a resistance 94 across the midpoints of the bridge. In the circuit of FIGURE 1, the capacitor 32, which is the equivalent of the capacitor 90, discharges each time the controlled rectifier fires. It is generally desirable to maintain the voltage of the capacitor 90 at a constant level independent of the firing of the controlled rectifier so that the capacitor 96 which it feeds may be charged at a fixed rate. This allows the circuit to fire earlier than the arrangement of FIGURE 1. Therefore, the rectifier 92 is inserted in series with the capacitor 90 and connected in such a direction as to prevent the capacitor 90 from discharging through the controlled rectifier when it fires. This addition improves the operation of the circuit but is made at the expense of complexity. The resistance 94 performs the function of slowing the initial charging rate of the capacitor 90 when the device is first connected to the line by closing switch 64 so as to prevent harmful surges.

The capacitor 90 is shunted by a series circuit comprising a resistance 98 and two gaseous (neon) voltage regulating tubes 100 and 102. The purpose of the regulator tubes 100 and 102 is to provide a voltage to capacitor 96 which is constant independent of appreciable variations in the line voltage. This is done by providing regulator tubes with a sustaining voltage slightly below the lowest voltage to which the capacitor 90 will become charged at the minimum normal line voltage. Two voltage regulator tubes are used rather than one because it is desired to provide a circuit in which the sustaining voltage is only slightly less than the strike voltage. The normal strike voltage of the regulator tubes is approximately twice that of the sustaining voltage. By providing two regulator tubes in series, their sustaining voltages add so that capacitor 96 which is shunted across them in series with the variable resistance 72 receives a voltage which may reach twice that of the sustaining voltage of one tube.

In order to strike the two tubes, their midpoint is brought to one midpoint of the bridge through a resistance 104. Before the regulator tubes strike, they exhibit nearly infinite resistance. Therefore, the voltage regulator tube 102 receives a voltage equal to the voltage between the midpoints of the bridge and strikes. Then its resistance decreases and most of the bridge midpoint voltage appears across the regulator 100 causing it to strike. The series of resistance 98 limits the current to the regulator tubes.

The junction point between the resistance 98 and the regulator tube 100 is brought to one end of the variable resistance 72 which has its other end connected in series with the capacitor 96 so that the resistance 72 controls the rate at which the capacitor 96 charges in the same manner that the resistance 42 controls the rate at which the capacitor 40 charges in FIGURE 1. One end of the capacitor 96 is connected to a rectifier 106 allowing the voltage of the capacitor 96 to be applied to a third neon regulator tube 108 which shunts it in series with a current limiting resistor 110 and a controlled rectifier cathode to gate bias resistor 112. The gate 88 is connected to the midpoints of the resistances 110 and 112.

The circuit is completed by a temperature sensitive resistance element 114, such as a thermistor, which is connected between the gate and the cathode of the controlled rectifier. The thermistor 114 has an inverse temperature resistance characteristic so that its resistance decreases as its temperature increases.

The thermistor 114 is physically placed in intimate contact with the controlled rectifier 86 so that it experiences a temperature which is closely related to the junction temperature of the controlled rectifier. At normal operating ranges of the device, the controlled rectifier does not heat appreciably and the resistance of the thermistor 114 is high enough so as to allow normal operation of the circuitry. If the controlled rectifier is subjected to excessive currents, as will occur when a lamp load 62 greatly in excess of the rating of the unit is employe, the heat generated by the controlled rectifier junction will raise the temperature of the thermistor 114 so that its resistance lowers and effectively shorts the gate 88 of the controlled rectifier to its cathode 82. This prevents the controlled rectifier from firing and halts the operation of the device.

It should be particularly noted that when the thermistor 114 cools down so as to regain its normal resistance after the controlled rectifier 86 ceases firing, the circuit does not automatically enter its normal mode of operation. This is because the sustaining voltage of the regulator lamp 108 is of such a low value as to maintain the gate 88 of the controlled rectifier at a voltage below its firing voltage after the lamp 108 is fired. Therefore, it is necessary that the lamp 108 be extinguished before the controlled rectifier 86 can again be fired. However, with the variable resistance 72 set at a low value, such as occurs when the controlled rectifier fires through a greater part of the cycle and heats up, sufficient current is supplied to the neon lamp 108 to maintain it in a sustained condition. In order to extinguish the lamp 108 and reset the circuit for operation, it is necessary to increase the resistance 72 to a point where the lamp 108 extinguishes. This is done by either lowering the setting of the variable resistance 72 or opening the line switch 64. Then the lamp 108 extinguishes and the circuit may be brought up to a desirable conduction level in the normal manner.

In this respect the effect of the thermistor 114 upon the circuit is like that of a circuit breaker. Were the circuit to re-ignite following the cooling of the thermistor, a repeated on-and-off action would occur and the circuit or other wiring might be damaged by the overload produced.

Figure 4A:
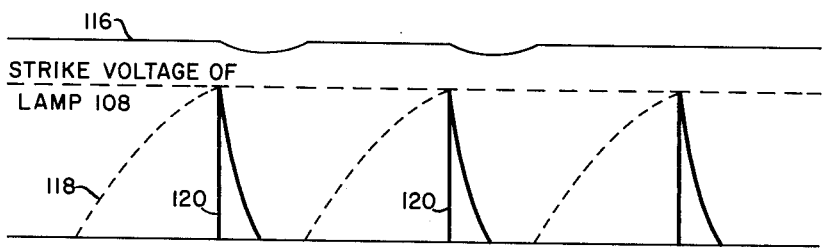
FIGURES 4A and 4B graphically represent certain wave forms which occur in the operation of the embodiment of FIGURE 3.
Figure 4B:
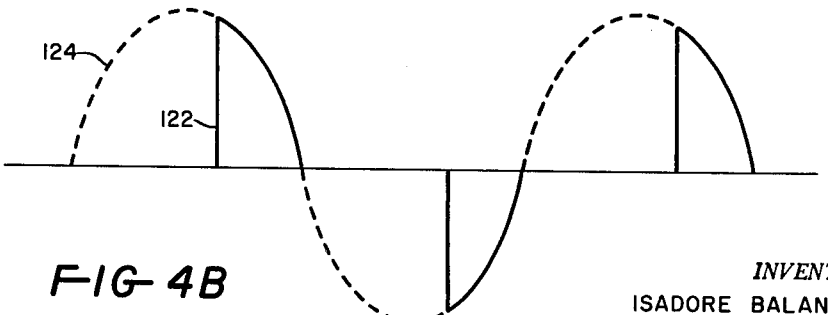

The operation of the circuit of FIGURE 3 is graphically illustrated in FIGURES 4A and 4B. The voltage across the lamps 101 and 102 is illustrated by the line 116 which is a constant equal to the sum of the sustaining voltages of the two lamps. Curve 118 represents the voltage rise across capacitor 96 as it charges through the variable resistance 72. When it reaches the strike voltage of the lamp 108, that lamp fires and produces a voltage increase at the gate 88 of the controlled rectifier illustrated by line 120 which immediately decays as the controlled rectifier fires and discharges the capacitor 96 and extinguishes the lamp 108 through the rectifier 106. FIGURE 4B illustrates the portion 122 of the alternating current cycle 124 which is passed to the lamp load upon the firing illustrated in FIGURE 4A. It is apparent that an increase in the resistance 72 would lower the slope of line 118 and decrease the amount of power supplied to the lamp load. A decrease in the resistance 72 would increase the slope of the line 118 causing it to reach the strike voltage of lamp 108 at an earlier point in each cycle and to increase the power to the lamp load.

Having thus described my invention, I claim:

1. A circuit for firing a controlled rectifier having a harmonically rising and falling voltage imposed across its cathode-anode circuit, comprising: a first capacitor; a rectifier disposed in series with said first capacitor across the cathode-anode circuit of said controlled rectifier in such a direction that said first capacitor is charged to substantially peak cathode-anode voltage and is prevented from discharging upon the firing of said controlled rectifier; a second capacitor; a variable resistance disposed in series with said second capacitor across said first capacitor whereby said resistance controls the rate of charging of said second capacitor from said first capacitor; a discharge path for said second capacitor through said controlled rectifier whereby said second capacitor discharges upon the firing of said controlled rectifier; and a neon breakdown switching device connected to said second capacitor and to the gate of said controlled rectifier in such manner as to supply said controlled rectifier with a voltage in excess of its firing voltage upon breakdown of such switching device.

2. A circuit for controlling the portion of an alternating current cycle passed from an alternating current source to a load, comprising: a solid state rectifier bridge having its inputs disposed in series with said load across said alternating current voltage source; a controlled rectifier having its anode and cathode across the midpoints of said bridge, whereby upon the firing of said controlled rectifier a path is established from the source through the load through one of two rectifier paths of the bridge; means for converting the voltage appearing across the midpoints of the bridge to a direct current voltage supply; a capacitor; a variable resistance disposed in series with said capacitor across said direct current voltage supply so as to control the rate of charging of said capacitor; a rectifier connecting said capacitor across the anode-cathode circuit of said controlled rectifier so as to discharge said capacitor upon the firing of said controlled rectifier; a neon breakdown switching device connected to said capacitor so as to experience substantially the entire voltage across said capacitor when in an unbroken-down state, and connected to the gate of said controlled rectifier so as to supply said controlled rectifier with a voltage in excess of its firing voltage upon the breakdown of said switching device; and a temperature sensitive resistance element having an inverse temperature resistance characteristic disposed in the gate-cathode circuit of said controlled rectifier so as to effectively short said gate-cathode circuit and prevent firing of the controlled rectifier upon the temperature of the circuitry exceeding a predetermined value and to thereby maintain said voltage breakdown switching device in a sustaining voltage condition for certain settings of said variable resistance.

(References on following page)

References Cited by the Examiner

UNITED STATES PATENTS

| | | | |
|---|---|---|---|
| 2,006,737 | 7/35 | Gessford | 328—84 X |
| 2,242,894 | 5/41 | Lyle | 315—251 |
| 2,366,537 | 1/45 | Livingston | 315—273 |
| 2,920,240 | 1/60 | Macklem. | |
| 2,991,405 | 7/61 | Carlson | 323—22 |
| 3,103,618 | 9/63 | Slater | 323—22 |

OTHER REFERENCES

General Electric Publication: Notes on the Application of the Silicon Controlled Rectifier, ECG–371–1, December 1958.

Solid State Products: Incorporation Publication (Bulletin D420–02) August 1959.

GEORGE N. WESTBY, *Primary Examiner.*

ARTHUR GAUSS, RALPH G. NILSON, *Examiners.*